United States Patent [19]

Towle

[11] 4,051,317
[45] Sept. 27, 1977

[54] XANTHAN RECOVERY PROCESS

[75] Inventor: Gordon Anson Towle, Landenberg, Pa.

[73] Assignee: Hercules Incorporated, Wilmington, Del.

[21] Appl. No.: 710,812

[22] Filed: Aug. 2, 1976

[51] Int. Cl.² .............................................. C08B 37/00
[52] U.S. Cl. .................................................. 536/114
[58] Field of Search ........................ 536/114; 424/180

[56] References Cited

U.S. PATENT DOCUMENTS 3,342,732   9/1967   Goetz ..................................... 536/114

*Primary Examiner*—Lewis Gotts
*Assistant Examiner*—Cary Owens
*Attorney, Agent, or Firm*—William S. Alexander

[57] ABSTRACT

Xanthan gum is precipitated from its fermentation broth by adding to said raw broth an effective amount of a specified aluminum salt whereby the pH of the solution is lowered to below about 3.5 and thereafter increasing the pH into the range between about 3.5 and 4.5.

4 Claims, No Drawings

XANTHAN RECOVERY PROCESS

This invention relates to the preparation of certain biologically produced water-soluble polysaccharide gums. More specifically, it relates to a new and improved technique for isolating such a polymer from the fermentation broth in which it is produced.

In recent years a relatively high level of research effort has been directed to the improvement and optimization of processes for preparing polysaccharide gums by fermentation. Of particular interest has been the heteropolysaccharide prepared by aerobic fermentation of bacteria of the Xanthomonas genus. Representative species of the Xanthomonas genus by which this polysaccharide is produced include X. begoniae, X. carotae, X. hederae, X. incari, X. malvacearum, X. phaseoli, and, in particular, X. campestris. The polysaccharide, which has been given the name "xanthan" or "xanthan gum" is a complex heteropolysaccharide containing glucose, mannose, and glucuronic acid groups in its polymer chain.

Commercial exploitation of xanthan gum has been held back by its relatively high cost compared to other water-soluble gums with which it must compete for high volume sales. While the preparation of a gum by fermentation is inherently expensive, a significant portion of the total cost of xanthan gum is directly attributable to the recovery of the gum from the raw fermentation broth.

The raw fermentation broth is a very viscous highly pseudoplastic solution containing about 0.5 to 4% xanthan gum by weight, along with small amounts of salts, xanthomonas cells and insoluble debris. In the typical recovery process, the broth is further diluted with water to reduce its viscosity, thus facilitating handling in subsequent precipitation steps. Optionally, the diluted solution can be centrifuged or filtered at this point of the process to remove undesirable solid, insoluble material. Methanol or another nonsolvent and potassium chloride are then added to flocculate the gum in the potassium salt form which is then recovered by centrifuging or some other solid/liquid separation technique. Further dissolution, reprecipitating and washing steps are thereafter employed, depending upon the degree of purity required. Recently, U.S. Pat. No. 3,382,229 has taught that precipitation can be effected by the action of polyvalent (principally divalent) cations at pH levels above about 8.5. Since xanthan gum is a carboxylated heteropolymer, there are occasions when it is desirable to carry out recovery operations thereon in acid media. However, the art, as represented by the cited U.S. patent, teaches that the polyvalent metal salts are soluble below pH 8.5. Other art, e.g., U.S. Pat. No. 3,383,307 teaches that certain trivalent salts including aluminum sulfate are employed in the presence of a free hydrogen-releasing metal to form gels of xanthan gum. Such a gel, however, is not readily removed from the aqueous phase.

Now in accordance with this invention a technique is provided whereby certain selected aluminum salts can be used to insolubilize and precipitate xanthan gum from a fermentation broth in a readily recoverable form. The technique of the invention comprises adding to a solution of xanthan gum an aluminum salt selected from the class consisting of aluminum chloride, aluminum nitrate and aluminum acetate, and thereafter increasing the pH of the solution to a level between about 3.5 and 4.5.

The pH of a xanthan solution as it is obtained at the completion of the fermentation step is about 5 to 8.5. The addition of the stoichiometric amount of the specified aluminum salts reduces this pH to about 3 or less. At pH 3, the aluminum salt or complex is on the borderline of solubility in aqueous media so that either a clear solution or a solution containing a small amount of structure results. Considering the teachings of the prior art concerning the behavior of other polyvalent metal xanthanate salts at acidic pH levels and of aluminum xanthanate at high pH, this behavior would not have been predicted.

Another surprising feature of the invention is that reducing the pH of the xanthan solution to the low level specified above by addition of the aluminum salt often results in a reduction of the viscosity of the solution without harming the xanthan, i.e., without causing any degradation of the polymer chain length. For example, a fermentation broth having a viscosity of about 1000 centipoises at its reaction pH will be reduced to about 500 centipoises at pH 2.5 in the presence of aluminum ion.

As stated hereinabove, it has been necessary with prior xanthan processes to dilute the raw fermentation broth to a considerable degree to reduce its viscosity to a point where the recovery operations can be carried out. The amount of dilution required when proceeding according to the present invention is reduced. In fact, it is possible to effect precipitation via the specified aluminum salts with substantially no dilution from the solutions obtained from the fermentation.

Carrying out the method of the invention so that the pH is reduced to the level indicated assures that gelling is avoided or, if a gel forms, assures that it breaks and the xanthan gum goes into solution as discussed above. Unsatisfactory results are realized in the sense that an easily separable product is not obtained when the pH of the ferment is not reduced and then adjusted into the range where the xanthan is insoluble and nongelling.

Following the addition of the specified aluminum salt and its resultant lowering of the pH, precipitation of the xanthan gum is accomplished by increasing the pH into the range between about 4 and 4.5. This pH range appears to be critical. Outside of this range, either the material is marginally soluble so that it does not precipitate or it is likely to form a gel. As the art teaches, the aluminum salt begins to approach to a solubility condition as the pH increases in aqueous media. The upper limit of about 4.5 is critical to avoid incipient solubility and the gelling which will occur at that point in aqueous media.

As stated above, one of the advantages of the present invention is that precipitation of the xanthan gum can be accomplished without greatly diluting the fermentation broth as has been customary in the prior art. The gum can be precipitated from even relatively viscous solutions. If it is desired to separate insoluble material such as cell walls remaining from the fermentation prior to the precipitation step, the broth can be diluted in the customary manner to reduce its viscosity to a more readily filterable state. In many, if not most cases, however, removal of insolubles is not necessary and this step can be omitted.

The aluminum salts which have been found useful in carrying out the process of this invention are water-soluble salts with monovalent anions, namely, aluminum chloride, aluminum nitrate, and aluminum acetate. Salts with polyvalent cations which have been tried, such as aluminum sulfate and aluminum citrate, have been found ineffective, resulting in formation of gels or other forms which are difficulty separable.

The aluminum salt is preferably used in slight excess of the stoichiometric amount required to react with all free carboxyl groups of the gum. The stoichiometric amount is usually on the order of about 0.18 gram of aluminum per gram of the gum to be recovered. Normally about 10% excess over stoichiometric will suffice. Greater amounts are not harmful, but use of greater amounts is wasteful and requires greater volumes of reagents later in the process when the aluminum is removed.

The optimal amount of aluminum salt required can readily be determined by carrying out the aluminum precipitation on small test portions of the ferment using increasing amounts of aluminum salt. At optimal aluminum salt levels, a dense aluminum xanthanate floc is obtained which is easily recovered by screening and can be readily compacted to a solids level of about 20%. Optimal aluminum ion concentration is usually found to be about 1 part aluminum ion per 5 parts dry gum (weight basis).

The insoluble aluminum salt or complex is then slurried in a liquid medium which is a nonsolvent for xanthan gum where it is treated with a strong acid to remove aluminum. A typical xanthan nonsolvent medium is a mixture of a low molecular weight alcohol, e.g., a $C_1$ to $C_4$ alcohol, and water. Isopropanol is preferred. Other organic media such as acetone or other low molecular weight ketones can also be used, depending upon availability and other factors. Some water is desirably present in this medium as water is the best solvent for the aluminum salt which results from the acid treatment of aluminum xanthanate. Substantially any of the strong mineral acids which form water-soluble aluminum salts can be used in the purification steps, e.g., sulfuric, hydrochloric, and nitric acid.

The product is subjected to repeated washing with the alcohol until substantially all residues of aluminum are removed. The aluminum-free gum is then dried at slightly elevated temperature and ground to give a dense, free flowing powder which readily disperses in water, forming a homogeneous, viscous solution.

EXAMPLE 1

One liter of *Xanthomonas campestris* fermentation broth containing about 1.8% xanthan gum was diluted with twice its volume of tap water. Fifteen ml. of 28% aqueous aluminum chloride solution was added, reducing the pH to about 3. The dilute broth was then centrifuged at 25–30,000 r.p.m. in a continuous flow centrifuge to remove cells and debris. The pH of the clarified broth was then raised to 4 by slowly adding about 75 ml. of 10% sodium hydroxide solution. As the pH approached 4, the xanthan gum separated from solution in the form of a firm, cohesive floc.

The precipitate was filtered through a 100-mesh nylon screen and compacted to yield a filter cake containing about 20% solid matter. To remove aluminum, the filter cake was suspended in 400 ml. of isopropanol containing 20 ml. of concentrated hydrochloric acid and mixed in a blender to produce a uniform slurry. The slurry was allowed to stand about 15 min. and the insoluble gum was collected on a 100-mesh nylon screen and squeezed to expel excess solvent, yielding a cake of about 40% solids. This was repeated using 250 ml. of isopropanol:water:hydrochloric acid (14:5:1, v/v). The cake was then suspended in 250 ml. of 70% aqueous isopropanol in a blender and neutralized to pH 7–8 by addition of about 10 ml. of 20% sodium hydroxide solution. The product was collected on 100-mesh nylon screen, compacted to give a cake of about 45% solids and dried in a vacuum oven at 50° C.

About 18 g. of light tan colored, powdery xanthan gum was recovered. Analysis showed less than 1% nitrogen and less than 0.3% residual aluminum. The product dissolved readily in tap water, yielding a highly viscous, translucent solution.

EXAMPLE 2

To one liter of *Xanthomonas campestris* fermentation broth containing about 1.8% xanthan gum was added 30 grams of aluminum nitrate dissolved in a small volume of water. After thorough mixing, the pH was raised to about 4 by addition of 75 ml. of 10% sodium hydroxide solution. As the pH approached 4, the xanthan precipitated as a firm, cohesive floc. This was collected on a 100-mesh nylon screen and compacted to yield a cake containing about 20% solids.

The cake was dried in a forced draft oven at 60°–70° C. and ground to pass a 20-mesh screen. The dry powder was suspended in 200 ml. of isopropanol:water:hydrochloric acid, 14:5:1 (v/v) and stirred for 15 minutes and then filtered using a medium porosity sintered glass funnel and reduced pressure. The residue was resuspended in 150 ml. of the above mixture and the filtration was repeated. The residue was then suspended in 150 ml. of 70% aqueous isopropanol, filtered, resuspended in 150 ml. of 70% aqueous isopropanol and neutralized to pH 7–8 by addition of potassium hydroxide solution. The suspension was filtered and the residue dried in a vacuum oven at 50° C.

The dry product was ground to give a light tan powder which dissolved readily in water to give a highly viscous, translucent solution. The material was found to contain less than 1% nitrogen and less than 0.05% residual aluminum.

EXAMPLE 3

To 1 liter of *Xanthomonas campestris* fermentation broth containing about 1.8% xanthan gum was added 6 grams of aluminum acetate dissolved in a small volume of water. After thorough mixing of the aluminum salt into the broth, the pH was raised to about 4 by addition of 75 ml. of 10% sodium hydroxide solution. As the pH approached 4, the xanthan precipitated as a firm, cohesive floc. This was collected on a 100-mesh nylon screen and compacted to yield a cake containing about 20% solids.

The cake was suspended in 400 ml. of isopropanol containing 20 ml. of concentrated hydrochloric acid and mixed in a blender to produce a uniform slurry. The slurry was allowed to stand about 15 minutes, following which the insoluble gum was collected on a 100-mesh nylon screen and compacted to yield a cake of about 40% solids. This was repeated using 250 ml. of isopropanol:water:hydrochloric acid (14:5:1, v/v). The cake was then suspended in 250 ml. of 70% aqueous isopropanol in a blender and neutralized to pH 7–8 by addition of about 10 ml. of 20% sodium hydroxide solution. The product was collected on 100-mesh nylon screen, compacted to give a cake of about 45% solids and dried in a vacuum oven at 50° C.

Along 18 g. of light tan colored, powdery xanthan gum was recovered. Analysis showed less than 1% nitrogen and less than 0.3% residual aluminum. The product dissolved readily in tap water yielding a highly viscous, translucent solution.

What I claim and desire to protect by Letters Patent is:

1. A method of precipitating xanthan gum from an aqueous solution which comprises adding an aluminum salt to said solution, and thereafter increasing the pH of the solution to a level between about 3.5 and 4.5, said aluminum salt being selected from the class consisting of aluminum acetate, aluminum chloride, and aluminum nitrate.

2. The method of recovering xanthan gum from a fermentation broth of bacterium of the Xanthomonas genus which comprises adding an aluminum salt to said solution, thereafter increasing the pH of the solution to a level between about 4 and 4.5, and recovering precipitated xanthan gum, said aluminum salt being selected from the class consisting of aluminum acetate, aluminum chloride, and aluminum nitrate.

3. The method of claim 2 including the additional step of removing insoluble materials prior to precipitating the gum.

4. The method of claim 2 wherein the Xanthomonas bacterium is *Xanthomonas campestris*.